(12) United States Patent
Schott et al.

(10) Patent No.: US 10,346,079 B2
(45) Date of Patent: Jul. 9, 2019

(54) SYSTEM AND METHOD FOR MANAGING STORAGE SYSTEM SNAPSHOTS

(71) Applicant: Dell Products, L.P., Round Rock, TX (US)

(72) Inventors: Eric Robert Schott, Epsom, NH (US); Nishant Kanaiyalal Mehta, Ashland, MA (US); Timothy D. Nolan, Windham, NH (US); Paul Anthony Calato, Amherst, NH (US); Shari Ann Vietry, Merrimack, NH (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/072,029

(22) Filed: Mar. 16, 2016

(65) Prior Publication Data

US 2016/0196088 A1 Jul. 7, 2016

Related U.S. Application Data

(63) Continuation of application No. 13/786,628, filed on Mar. 6, 2013, now Pat. No. 9,298,372.

(51) Int. Cl.
*G06F 12/02* (2006.01)
*G06F 3/06* (2006.01)
*G06F 16/2457* (2019.01)

(52) U.S. Cl.
CPC ........... *G06F 3/0644* (2013.01); *G06F 3/065* (2013.01); *G06F 3/067* (2013.01); *G06F 3/0608* (2013.01);

(Continued)

(58) Field of Classification Search
None
See application file for complete search history.

(56) References Cited

U.S. PATENT DOCUMENTS 7,536,529 B1    5/2009  Chatterjee et al.
7,676,510 B1 *  3/2010  Karinta ............ G06F 17/30088
                                            707/654

(Continued)

FOREIGN PATENT DOCUMENTS

WO   2006052390       5/2006
WO   2009145928 A1   12/2009
WO   2014137379       9/2014

OTHER PUBLICATIONS

European Patent Office, European Search Report, European Patent Application No. 13877089, dated Sep. 22, 2016.

*Primary Examiner* — Charles Rones
*Assistant Examiner* — Ryan Dare
(74) *Attorney, Agent, or Firm* — Isidore PLLC

(57) ABSTRACT

A method of managing snapshots on a storage system includes a storage controller (1) receiving a request to store a first snapshot associated with a first volume among a plurality of volumes on the storage system and (2) determining if an assigned snapshot reserve space remaining associated with the first volume is less than an amount of space that is required to store the first snapshot. In response to the assigned snapshot reserve space remaining being less than the amount of space required, borrowing snapshot reserve space from at least one of an unused assigned space or an unused unassigned space within the storage system and storing at least a portion of the first snapshot to the borrowed snapshot reserve space.

20 Claims, 9 Drawing Sheets

(52) U.S. Cl.
CPC .......... *G06F 3/0614* (2013.01); *G06F 3/0683* (2013.01); *G06F 3/0689* (2013.01); *G06F 16/24578* (2019.01)

(56) References Cited

U.S. PATENT DOCUMENTS

| | | |
|---|---|---|
| 2005/0108292 A1 | 5/2005 | Burton et al. |
| 2005/0273570 A1 | 12/2005 | Desouter et al. |
| 2006/0047926 A1 | 3/2006 | Zheng |
| 2007/0174569 A1 | 7/2007 | Schnapp |
| 2009/0172039 A1 | 7/2009 | Honami et al. |
| 2009/0300303 A1* | 12/2009 | Balasubramanian ........................ G06F 3/0608 711/162 |
| 2009/0307449 A1 | 12/2009 | Prahlad |
| 2011/0072224 A1 | 3/2011 | Popouski et al. |
| 2011/0185120 A1 | 7/2011 | Jess |
| 2012/0066450 A1 | 3/2012 | Yochai et al. |
| 2014/0156956 A1 | 6/2014 | Ezra |

\* cited by examiner

SYSTEM AND METHOD FOR MANAGING STORAGE SYSTEM SNAPSHOTS

RELATED APPLICATIONS

This application is continuation application of U.S. patent application Ser. No. 13/786,628, filed Mar. 6, 2013 entitled "System and Method for Managing Store System Snapshots", which is fully incorporated herein by reference.

BACKGROUND

1. Technical Field

The present disclosure generally relates to storage systems for data and in particular to managing periodic snapshots of volumes within a storage system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system can be configured in several different configurations. The information handling system can range from a single, stand-alone computer system to a distributed, multi-device computer system, to a networked computer system with remote or cloud storage systems. Both computer storage systems and remote or cloud storage systems can include redundant arrays of independent drives (RAID) that use hard disk drives or solid state storage drives. The drives are arranged as a storage pool, which can be partitioned into a number of volumes for the storage of data. The information handling system can be configured to store one or more copies of the volumes called a snapshot at regular periods of time. A snapshot is a copy of a volume at a point in time. Snapshots help to prevent loss of data in the event of a system malfunction.

One implementation for the storage of snapshots is copy on write. In copy on write, only pages written after completion of the volume snapshot consume additional storage space. The other pages in the snapshot are shared with the base volume. Each write to a distinct page causes a new page to be allocated for the storage of snapshots. Typically, a certain amount of space is reserved for the storage of snapshots per volume.

The number of input/output operations or writes to a storage device depends on many factors and is difficult for a system administrator to predict. As a result, it is difficult to determine the amount of space needed to store snapshots. If too much space is set aside for the storage of snapshots, the storage system will have poor utilization and excess unused space. If too little space is set aside for the storage of snapshots, the storage system will not be able to store all of the desired snapshots or may have to delete snapshots in order to create unused storage space.

Thin provisioned volumes make determining the amount of space needed to store snapshots even more difficult. A thin provisioned volume has a virtual capacity and a real capacity. Typically, the virtual capacity of a thin provisioned volume is significantly larger than its real capacity. Pages to a thin volume are only allocated on demand when a write occurs. Some thin provisioned volumes are allocated snapshot reserve space as a percentage of the volume reserve. Unfortunately, with this type of snapshot reserve space allocation, storage commands, such as the SCSI UNMAP command can have a detrimental effect. The unmapped pages cause a decrease in the volume reserve thereby decreasing the snapshot reserve. In addition an UNMAP command causes an increase in the consumption of snapshot reserve since the pages unmapped still need to be stored for the snapshots. Thus an UNMAP has a dual effect of decreasing the snapshot reserve and increasing snapshot usage. This change can cause an overage of snapshot reserve and lead to deletion of snapshots.

BRIEF SUMMARY

Disclosed are a method, a storage system and an information handling system (IHS) that (1) enables a volume to use space beyond its snapshot reserve by borrowing unused assigned space or free space on the storage array and (2) determines snapshots to be deleted when total storage system utilization reaches a pre-set threshold.

According to one embodiment, the method comprises a storage controller: receiving a request to store a first snapshot associated with a first volume among a plurality of volumes on the storage system; determining if an assigned snapshot reserve space remaining associated with the first volume is less than an amount of space that is required to store the first snapshot; in response to the assigned snapshot reserve space remaining being less than the amount of space required, borrowing snapshot reserve space from at least one of an unused assigned space or an unused space within the storage system; and storing at least a portion of the first snapshot to the borrowed snapshot reserve space.

Also disclosed is a solid state storage system comprising: a plurality of storage devices; a storage controller coupled to the storage devices for controlling storage operations, wherein the storage controller comprises logic that: receives a request to store a first snapshot associated with a first volume among a plurality of volumes on the storage system; determines if an assigned snapshot reserve space remaining associated with the first volume is less than an amount of space that is required to store the first snapshot; in response to the assigned snapshot reserve space remaining being less than the amount of space required, borrows snapshot reserve space from at least one of an unused assigned space or an unused space within the storage system; and stores at least a portion of the first snapshot to the borrowed snapshot reserve space.

Also disclosed is an information handling system (IHS) comprising: one or more processors; a storage system coupled to the processor and in communication with the processor, the storage system comprising: and a plurality of storage devices and a storage controller coupled to the storage devices, the storage controller having firmware executing thereon to provide control of storage system operations. The firmware configures the storage controller to: receive a request to store a first snapshot associated with a first volume among a plurality of volumes on the storage system; determine if an assigned snapshot reserve space remaining associated with the first volume is less than an amount of space that is required to store the first snapshot; in response to the assigned snapshot reserve space remaining being less than the amount of space required, borrow snapshot reserve space from at least one of an unused assigned space or an unused space within the storage system; and store at least a portion of the first snapshot to the borrowed snapshot reserve space.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
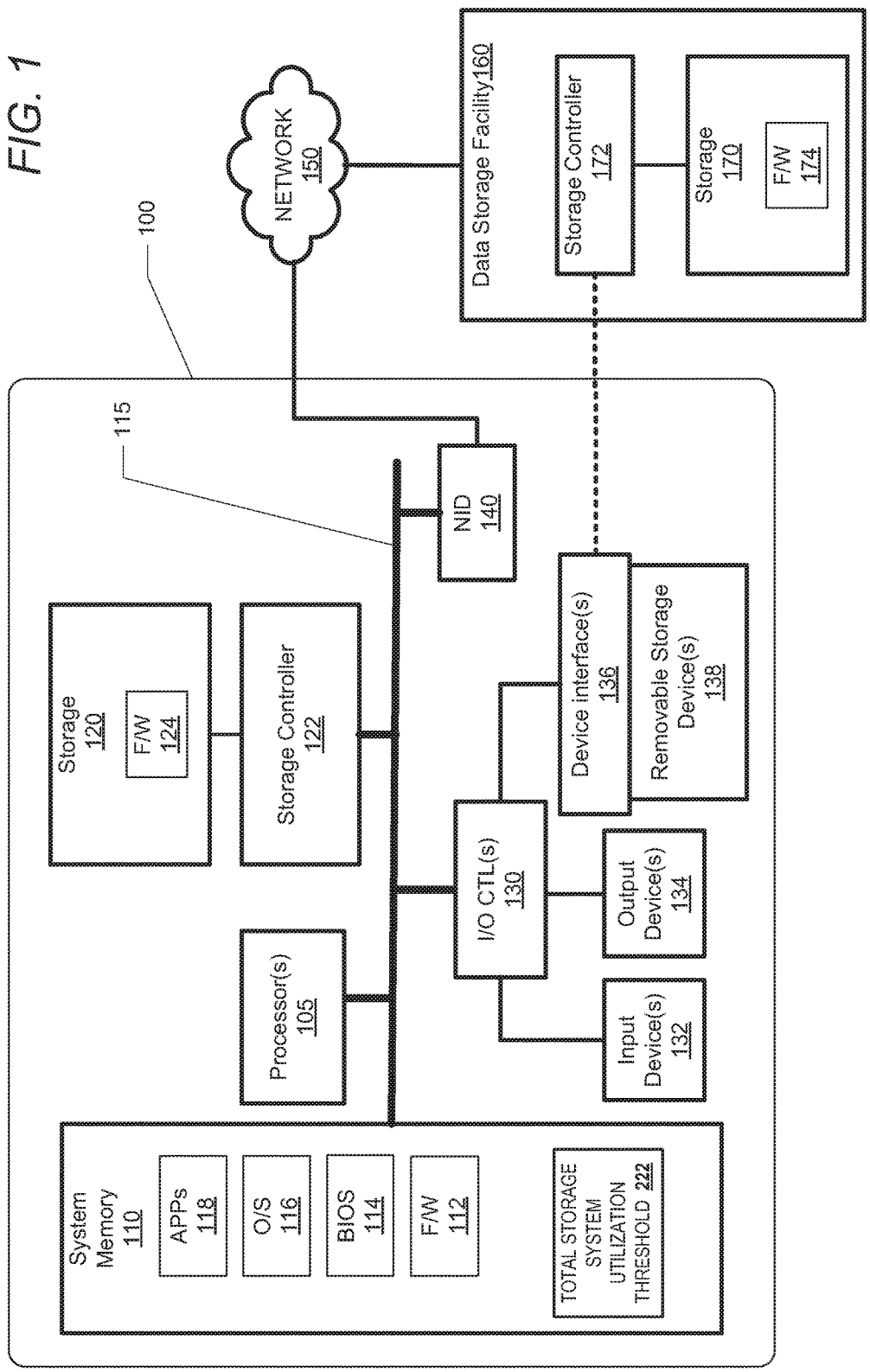
FIG. 1 illustrates an example information handling system within which various aspects of the disclosure can be implemented, according to one or more embodiments.

The illustrative embodiments provide an information handling system (IHS), a solid state storage system and a method performed within the information handling system that (1) enables a storage system to handle an overage in the snapshot reserve by temporarily borrowing unused space to store snapshots and that (2) determines snapshots to be deleted when total storage system utilization reaches a maximum threshold.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 105 coupled to system memory 110 via system interconnect 115. System interconnect 115 can be interchangeably referred to as a system bus, in one or more embodiments. Also coupled to system interconnect 115 is a storage controller 122 coupled to storage 120 within which can be stored software and/or firmware 124 and one or more sets of data (not specifically shown). As shown, system memory 110 can include therein a plurality of modules, including firmware (F/W) 112, basic input/output system (BIOS) 114, operating system (O/S) 116, application(s) 118, and a total storage system utilization threshold 222. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interfaces 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s) 138, such as a compact disk (CD), digital video disk (DVD), flash drive, or flash memory card. In one or more embodiments, device interface(s) 136 can also provide an integration point for connecting other device(s) to IHS 100. In such implementation, device interfaces 136 can further include General Purpose I/O interfaces such as I²C, SMBus, and peripheral component interconnect (PCI) buses.

IHS 100 comprises a network interface device (NID) 140. NID 140 enables IHS 100 to communicate and/or interface with other devices, services, and components that are located external to IHS 100. These devices, services, and components can interface with IHS 100 via an external network, such as example network 150, using one or more communication protocols.

Network 150 can be a local area network, wide area network, personal area network, and the like, and the connection to and/or between network and IHS 100 can be wired or wireless or a combination thereof. For purposes of discussion, Network 150 is indicated as a single collective component for simplicity. However, it is appreciated that network 150 can comprise one or more direct connections to other devices as well as a more complex set of interconnections as can exist within a wide area network, such as the Internet.

In the illustrative embodiment, network 150 also provides access to data storage facility 160, which can include a plurality of hard disk drives, solid state storage drives, solid state storage devices or other storage media. In one embodiment, data storage facility 160 is a redundant array of storage drives or hard drives. Data storage facility 160 includes a storage controller 172 coupled to storage 170 within which can be stored software and/or firmware 174 and one or more sets of data (not specifically shown). In an alternate embodiment, and as represented by the second set of dashed interconnecting lines, data storage facility 160 can be directly connected to IHS 100 as an external storage device.

Figure 2:
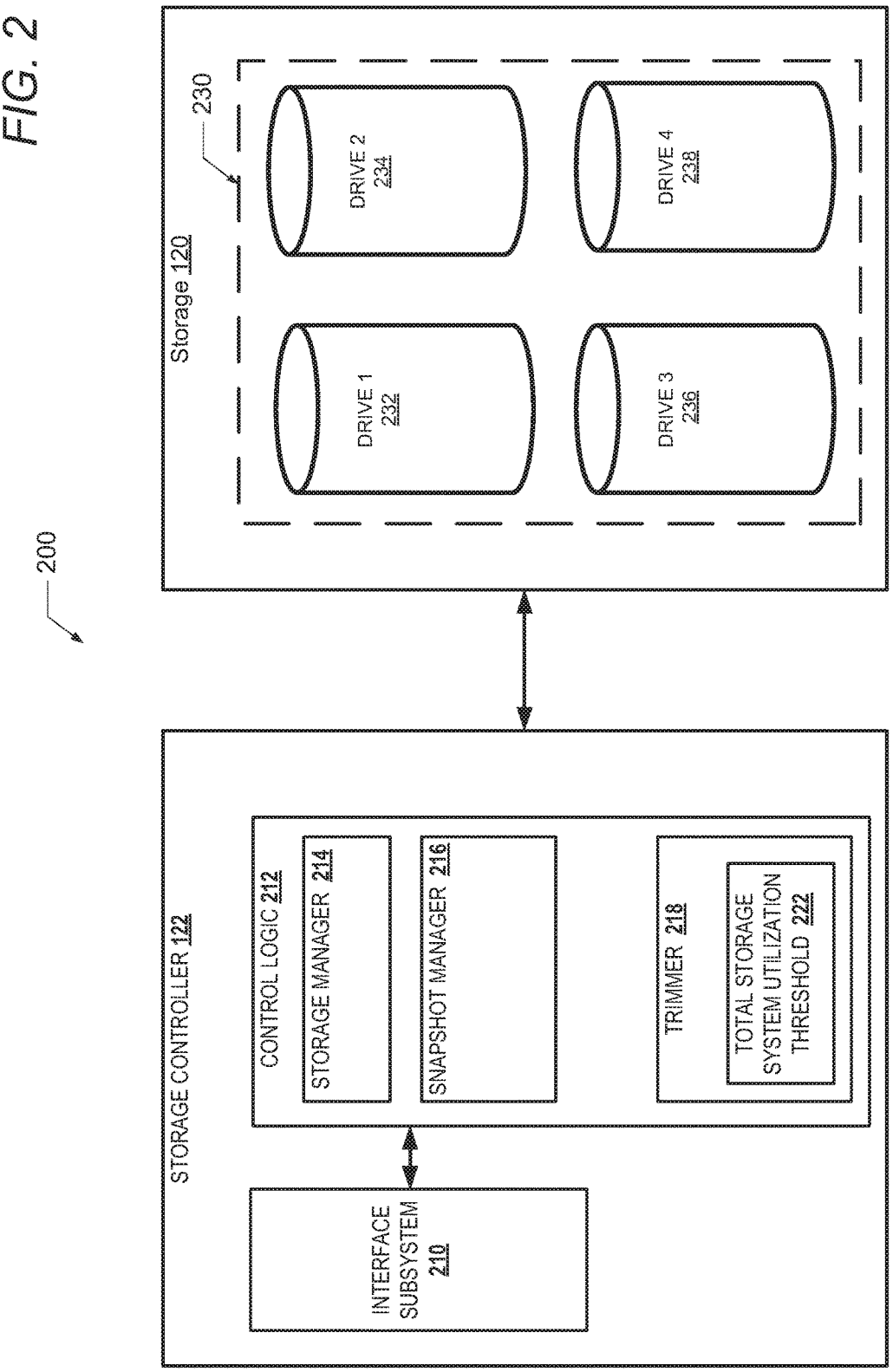
FIG. 2 illustrates a block diagram of an example storage system, in accordance with one or more embodiments.

With reference now to FIG. 2, there is illustrated one embodiment of storage subsystem 200 that can be utilized within IHS 100 and/or data facility 160 to store data, software and firmware. In the discussion of FIG. 2, reference is also made to elements described in FIG. 1. Storage subsystem 200 generally includes storage 120 and storage controller 122 that controls and manages the flow of commands and data to and from storage 120. Storage subsystem 200 can also represent storage 170 and storage controller 172 of data storage facility 160.

In one embodiment, storage 120 comprises an array or storage pool 230 of storage devices or storage drives including drive 1 232, drive 2 234, drive 3, 236 and drive 4, 238. While four drives are shown, more or fewer drives can be utilized within storage subsystem 200. In some embodiments, storage pool 230 can include hundreds of hard disk drives or solid state drives. Storage pool 230 can contain a plurality of volumes for storage of data.

Storage controller 122 contains the logic necessary to read and write to storage pool 230. Storage controller 122 comprises interface subsystem 210 and control logic 212. Interface subsystem 210 manages communications between control logic 212 of data storage facility 160 and system interconnect 115 FIG. 1). Control logic 212 comprises several functional modules or processes including storage manager 214, snapshot manager 216 and trimmer 218. Each of the storage controller components can communicate with each other via a communication fabric, which includes specific messaging signals communicated over specific signal lines (not illustrated). Functions, modules, routines, methods and processes of the present disclosure can be provided as firmware code and/or logic within storage controller 122. The firmware code and logic can implement storage manager 214, snapshot manager 216 and trimmer 218.

Storage manager 214 manages the reading and writing of data to storage pool 230 and can include data distribution techniques to improve storage reliability such as redundant array of independent drives (RAID). Storage manager 214 uses RAID technology to group the drives 232-238 within storage pool 230 into RAID SETS. Snapshot manager 216 manages the storing of snapshots to storage pool 230. A snapshot is a copy of a volume at a point in time. Trimmer 218 deletes snapshots that are stored on borrowed pool space to reclaim borrowed space when storage pool 230 approaches full capacity.

Trimmer 218 deletes snapshots from storage pool 230 when storage pool 230 approaches full capacity. Trimmer 218 includes a total storage system utilization threshold 222 that is used to determine if snapshots for any volume are to be deleted in order to have storage space available for storing new snapshots or allow for other forms of storage. In one embodiment, total storage system utilization threshold 222 could be set at 95 percent of the total storage system capacity being used. In one embodiment, total storage system utilization threshold 222 can be pre-determined by a user and stored in system memory 110. In another embodiment, total storage system utilization threshold 222 can vary and be dynamically determined by trimmer 218. In an additional embodiment, an initial total storage system utilization threshold 222 can be transmitted from system memory 110 to trimmer 218. Trimmer 218 can then modify the initial total storage system utilization threshold 222 into a new total storage system utilization threshold 222.

Those of ordinary skill in the art will appreciate that the hardware components and basic configuration depicted in FIGS. 1 and 2 and described herein may vary. For example, the illustrative components within IHS 100 (FIG. 1) are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

Figure 3:
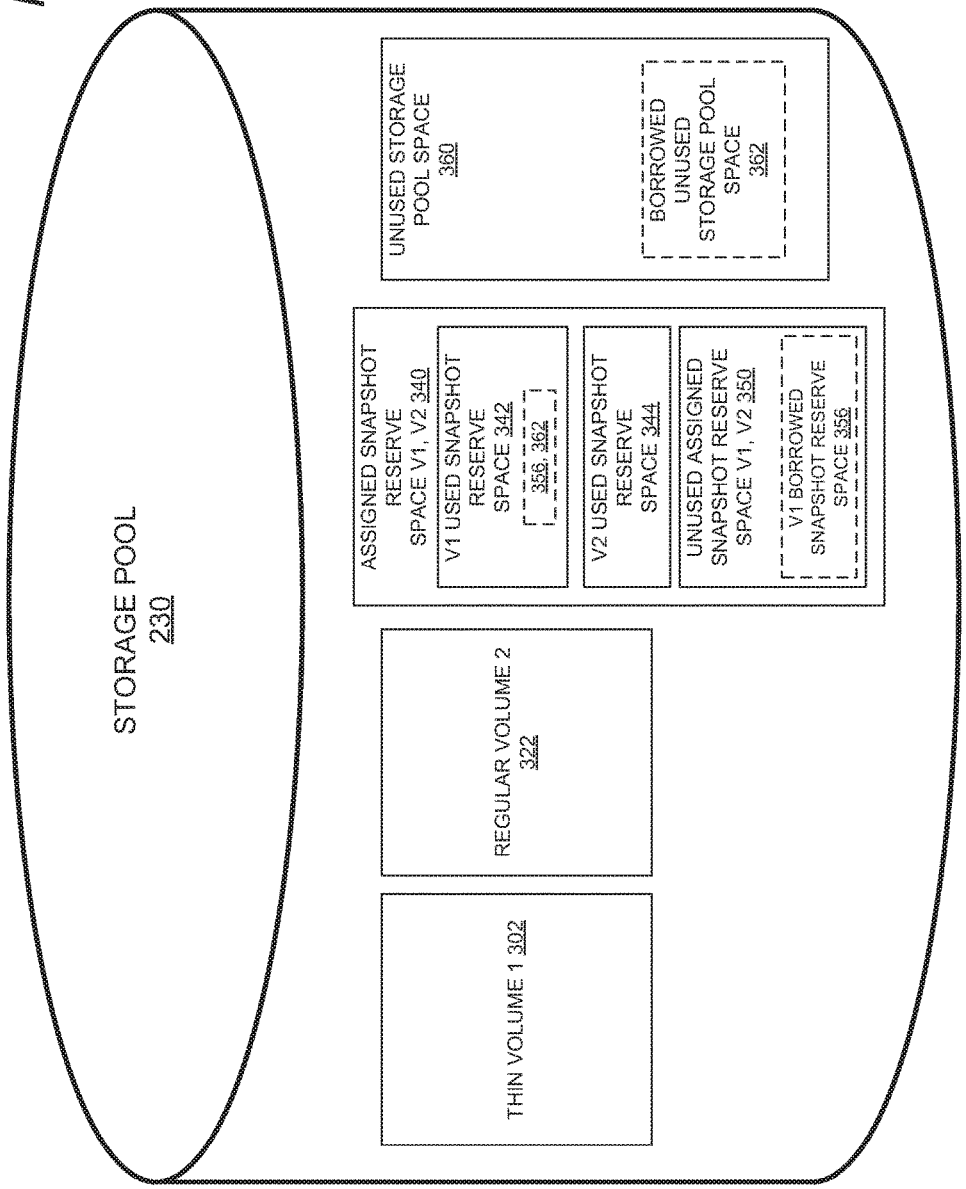
FIG. 3 illustrates an example of volumes, snapshots and snapshot reserve space allocated within a storage device, in accordance with one or more embodiments.

FIG. 3 illustrates further details of the contents of an example storage pool 230. In the discussion of FIG. 3, reference is also made to elements described in FIG. 1 and FIG. 2. The storage space within storage pool 230 comprises thin volume 1 302, regular volume 2 322, assigned snapshot reserve space 340, unused assigned snapshot reserve space 350 and unused storage pool space 360. Volumes 302 and 322 are individually accessible storage areas that are allocated or partitioned from the total storage area within storage pool 230. Thin volume 1 302 is a volume that is thin provisioned. A thin-provisioned volume has a virtual capacity and a real capacity. The virtual capacity is the volume storage capacity that is available to be written to. The real capacity is the physical storage capacity that is allocated to the volume from a storage pool. Typically, the virtual capacity of a thin-provisioned volume is significantly larger than its real capacity. The physical storage capacity for a thin volume is dedicated when data is actually written by the application and not when the storage volume is initially allocated. Regular volume 2 322 is a fully allocated volume where the virtual capacity and the real capacity are the same.

Assigned snapshot reserve space 340 is a portion of storage pool 230 that is allocated or dedicated to store snapshots of each of volumes 302 and 322. A snapshot is a copy of a volume taken at a point in time Tn. Assigned snapshot reserve space 340 contains volume 1 used snapshot reserve space 342 and volume 2 used snapshot reserve space 344. The size of the assigned snapshot reserve space 340 can be predetermined during the allocation of volume space.

A portion of the assigned snapshot reserve space 340 is unused and is designated as unused assigned snapshot reserve space 350. After one or more snapshots are written to volume 1 (V1) used snapshot reserve space 342 and/or V2 used snapshot reserve space 344, the unused assigned snapshot reserve space 350 is available for borrowing to store additional snapshots. Unused assigned snapshot reserve space 350 is the amount of storage space that remains within assigned snapshot reserve space 340 that is available for storage of additional snapshots by the assigned volumes and/or for borrowing to store additional snapshots for another volume that has exceeded its assigned snapshot reserve space.

All of the unused assigned snapshot reserve space 350 is available for borrowing by one or more volumes that have run out of snapshot space. In FIG. 3, volume 1 has borrowed snapshot reserve space that is designated as borrowed snapshot reserve space 356 from unused assigned snapshot reserve space 350. Borrowed snapshot reserve space 356 is space that is available for borrowing by other volumes to store addition snapshots. Specifically, borrowed snapshot reserve space 356 is storage space that was allocated or assigned to their respective volumes to store snapshots for that volume but are currently unused by the assigned volumes and have been re-purposed to store snapshots of other volumes that have run out of their assigned snapshot reserve space.

Unused storage pool space 360 is space within storage pool 230 that is not currently allocated to a volume or being utilized for the storage of data. Unused storage pool space 360 includes borrowed unused storage pool space 362. Borrowed unused storage pool space 362 is allocated for use by other volumes to store snapshots when additional space is needed by these volumes to store additional snapshots. Borrowed snapshot reserve space 356 and borrowed unused storage pool space 362 allow a volume to exceed or increase its allocated snapshot reserve space and preserve snapshots by leveraging storage space that is free or space that is assigned, but currently unused. According to one embodiment, snapshot manager 216 borrows snapshot space first from the unused assigned snapshot reserve space 350. Then, once there is no unused assigned snapshot reserved space 350 remaining to borrow from, snapshot manager 216 borrows the additional snapshot space required from the unused storage pool space 360.

Figure 4:
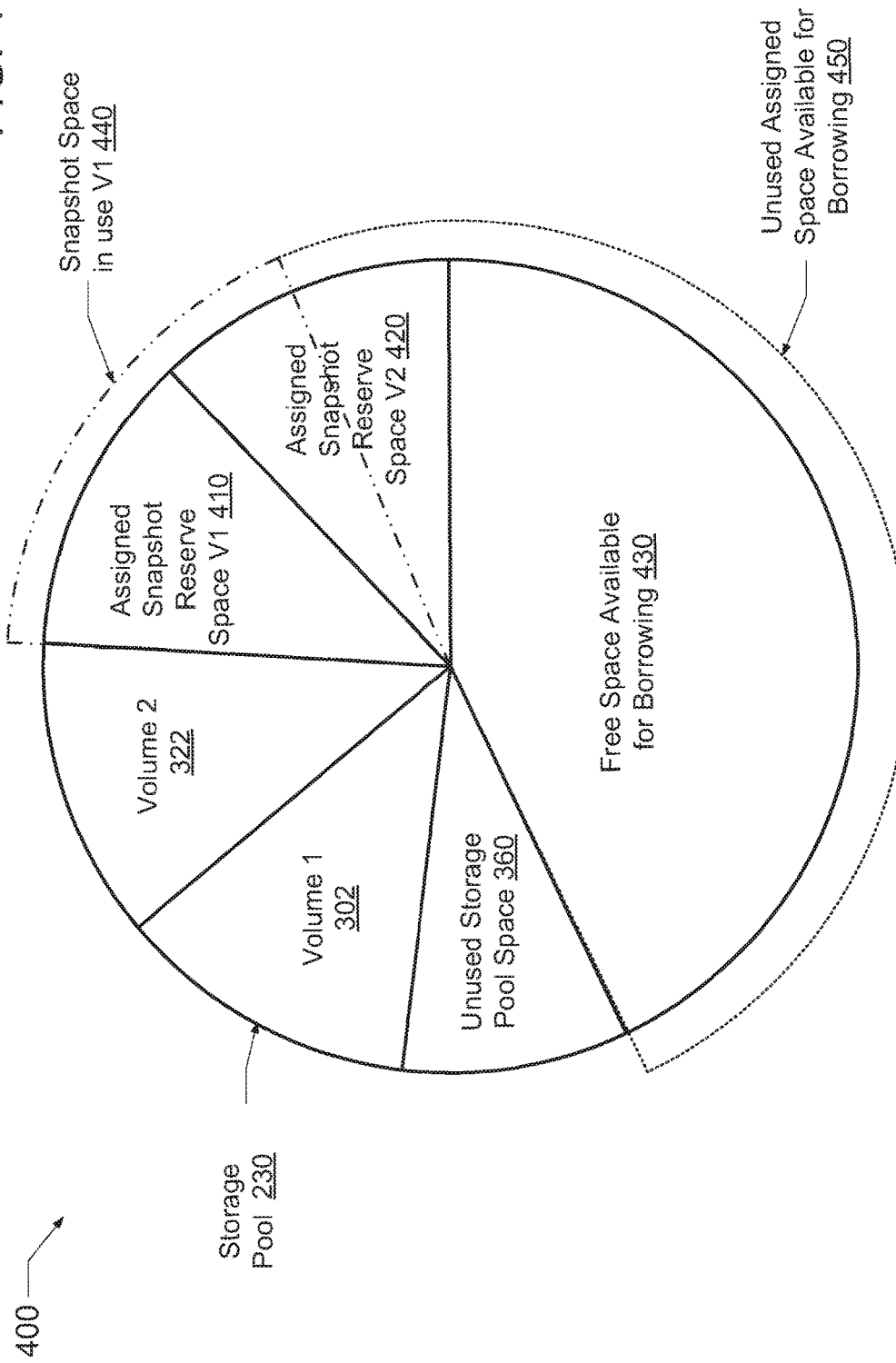
FIG. 4 illustrates an example of a storage pool with unused assigned space and free space available for snapshot borrowing, in accordance with one or more embodiments.

Turning to FIG. 4, there is illustrated an example storage pool state 400 of storage pool 230. In the discussion of FIG. 4, reference is also made to elements described in FIG. 1, FIG. 2 and FIG. 3. Storage pool 230 contains volume 1 302 and volume 2 322 for the storage of data. Storage pool 230 also contains assigned snapshot reserve space V1 410 for volume 1 and assigned snapshot reserve space V2 420 for volume 2. Snapshots can be stored to assigned snapshot reserve spaces 410 and 420. Storage pool 230 further includes free space available for borrowing 430, which can be assigned space, and unused storage pool space 360.

In one embodiment, the assigned snapshot reserve space V1 410 may not be large enough to store all of the snapshots desired to be stored for volume 1. Additional space to store snapshots for volume 1 can be borrowed from assigned snapshot reserve space 420. Volume 1 snapshots are stored within the total snapshot space in use for volume 1 440. The unused assigned space available for borrowing 450 (hereinafter unused assigned space 450) includes both the free space available for borrowing 430 and the unused portion of assigned snapshot reserve space 420.

In the example of FIG. 4, the amount of assigned snapshot reserve space V1 410 to store snapshots for volume 1 302 has been increased by borrowing snapshot storage space from unused assigned space 450 and specifically unused assigned snapshot reserve space V2 420, which was originally a part of unused assigned space 450 (as indicated by the short dotted radial lines outside 420). The borrowed snapshot reserve space (of assigned snapshot reserve space V1 410) utilized to store additional snapshots for volume 1

302 can be also be increased by borrowing snapshot storage space from unused storage pool space 360.

FIG. 5-FIG. 9 illustrate flowcharts of exemplary methods by which IHS 100 and storage controller 122 presented within the preceding figures, perform different aspects of the processes that enable one or more embodiments of the disclosure. Generally, methods 500, 600, 700, 800 and 900 collectively represent storage controller implemented methods to store snapshots of volumes to a storage device. The description of each method is provided with general reference to the specific components illustrated within the preceding figures. Generally each method is described as being implemented via control logic 212 and particularly the execution of code provided by software/firmware 124/174 acting within snapshot manager 216 and trimmer module 218. It is however appreciated that certain aspects of the described methods may be implemented via other processing devices and/or execution of other code. In the discussion of FIG. 5-FIG. 9, reference is also made to elements described in FIG. 1-FIG. 4.

Figure 5:
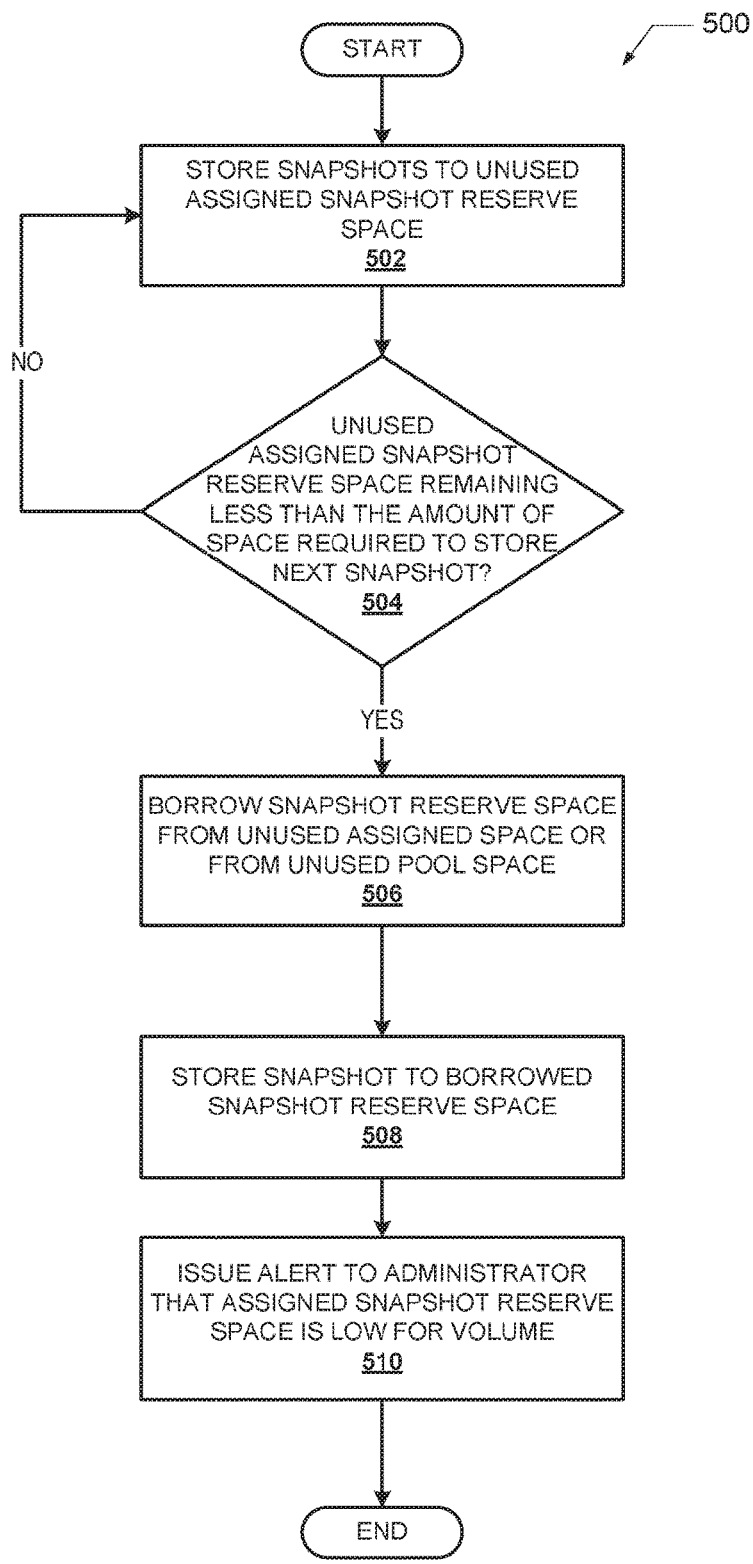
FIG. 5 is a flow chart illustrating one example of the method by which snapshot space is borrowed from either unused assigned snapshot reserve space or from unused pool space, according to one or more embodiments.

FIG. 5 illustrates an example method by which snapshot space is borrowed from either unused, assigned space 450 or from unused storage pool space 360. Method 500 begins at the start block and proceeds to block 502 where snapshot manager 216 periodically stores snapshots of one or more volumes 302, 322 to respective assigned snapshot reserve spaces 410, 420. Snapshot manager 216 determines at decision block 504 for each volume if the unused assigned snapshot reserve space remaining is less than the amount of space required to store the next snapshot for the respective volume.

In response to the unused assigned snapshot reserve space remaining not being less than the amount of space required to store another snapshot for the respective volume, snapshot manager 216 continues to store snapshots on a periodic basis to unused assigned snapshot reserve space 350 (502). In response to the unused assigned snapshot reserve space remaining being less than the amount of space required to store another snapshot for the respective volume, snapshot manager 216 borrows snapshot reserve space at block 506 from one or both of unused assigned space 450 (e.g., borrowed snapshot reserve space 356) or from unused storage pool space 360 (e.g., borrowed unused storage pool space 362). Snapshot manager 216 borrows unused snapshot reserve space such that there is sufficient space to store snapshots that are desired to be stored. The borrowing of unused snapshot reserve space allows the volume to use space beyond its designated snapshot reserve to preserve snapshots.

Snapshot manager 216 stores one or more snapshots to one or more borrowed snapshot reserve spaces 356, which can be borrowed from any unused, assigned space 450, or to borrowed unused storage pool space 362 (block 508) and optionally issues an alert to the system administrator that the snapshot reserve space is low for the particular volume at block 510. Method 500 then ends.

Figure 6:
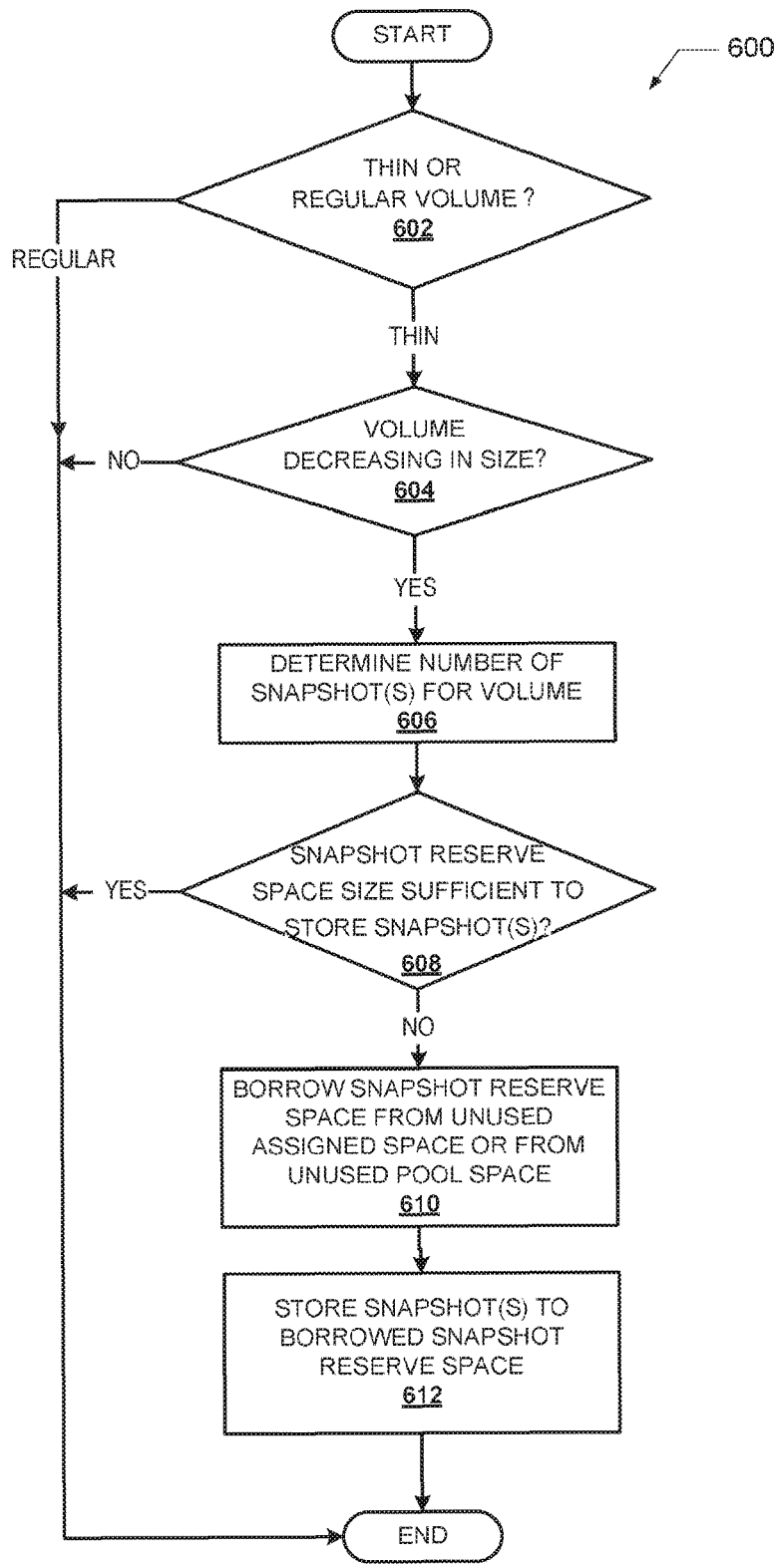
FIG. 6 is a flow chart illustrating one example of the method by which thin volumes retain snapshots during a decrease in volume size, according to one or more embodiments.

With reference to FIG. 6, a flow chart illustrating one embodiment of a method for a thin volume to retain snapshots during a decrease in volume size is shown. Method 600 begins at start block and proceeds to decision block 602 where snapshot manager 216 determines if the volume is a thin volume (i.e., thin volume 1 302) or a regular volume (i.e., regular volume 2 322). In response to the volume being a regular volume, method 600 ends. In response to the volume being a thin volume, snapshot manager 216 determines if the size of the volume is decreasing (block 604). A decrease in the size of the volume can occur if a SCSI UNMAP command is issued to de-allocate and reclaim storage space within a volume. The SCSI UNMAP command causes a decrease in the snapshot reserve space size only on storage systems that assign snapshot reserve space as a percentage of the total volume reserve.

In response to the volume not decreasing in size, method 600 ends. In response to the volume decreasing in size, snapshot manager 216 determines the number of snapshots stored on the volume that is decreasing in size (block 606). At block 608, snapshot manager 216 determines if the assigned snapshot reserve space for volume 1 410 is sufficient or a large enough amount of space to store the number of snapshots contained in the thin volume. In response to the snapshot reserve space being sufficient to store the number of snapshots contained in the thin volume, method 600 ends. In response to the assigned snapshot reserve space for volume 1 not being sufficient to store the number of snapshots contained in the volume, snapshot manager 216 borrows snapshot reserve space at block 610 from one or both of unused assigned space 450 (e.g., V1 borrowed snapshot reserve space 356) or from unused storage pool space 360 (e.g., borrowed unused storage pool space 362). Snapshot manager 216 stores one or more snapshots to one or more borrowed snapshot reserve spaces 356 or 362 (block 612). Method 600 then terminates at the end block.

Figure 7:
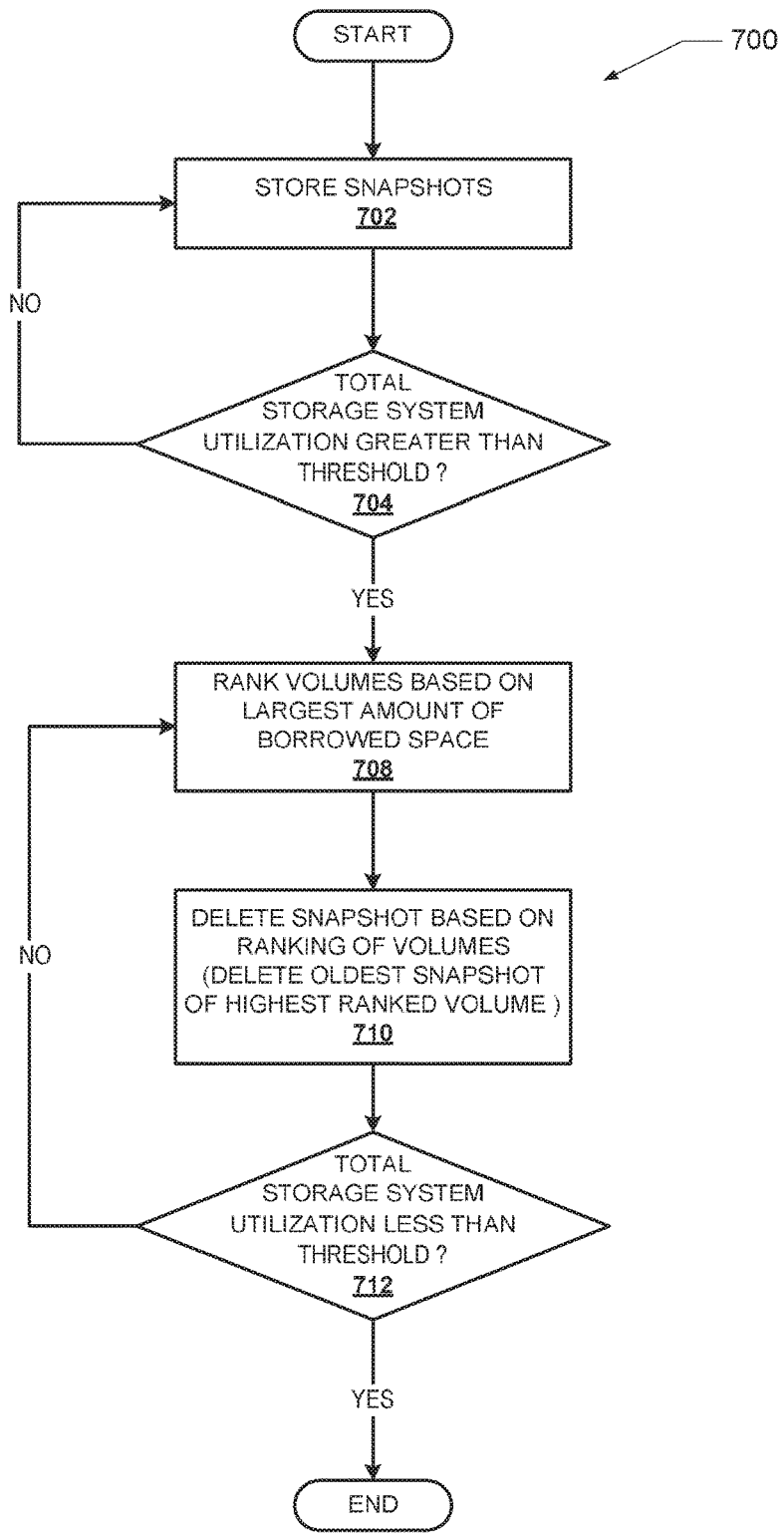
FIG. 7 is a flow chart illustrating one example of the method by which snapshots are deleted when the total storage system capacity approaches a maximum capacity, according to one or more embodiments.

FIG. 7 illustrates an example method by which snapshots are deleted when the total storage system capacity approaches a maximum capacity. Method 700 begins at the start block and proceeds to block 702 where snapshot manager 216 periodically stores snapshots of one or more volumes 302, 322 to respective assigned snapshot reserve spaces 410, 420. Trimmer module 218 determines at decision block 704 if the total storage system utilization of storage 120 is greater than a total storage system utilization threshold 222 (e.g., 90% utilization). In response to the total storage system utilization not being greater than the total storage system utilization threshold 222, snapshot manager 216 continues to store snapshots on a periodic basis (block 702). In response to the total storage system utilization being greater than the total storage system utilization threshold 222, trimmer module 218 ranks the volumes with snapshots based on the largest amount of borrowed space that has been borrowed by each of those volumes (block 708). The highest ranked volumes have the largest amount of borrowed space. At block 710, trimmer module 218 deletes the oldest snapshot of the highest ranked volume.

Trimmer module 218 determines at decision block 712 if the total storage system utilization of storage 120 has fallen below or is less than total storage system utilization threshold 222. In response to the total storage system utilization not being less than the total storage system utilization threshold 222, trimmer module 218 returns to block 708. In response to the total storage system utilization being less than the total storage system utilization threshold 222, method 700 ends.

Figure 8:
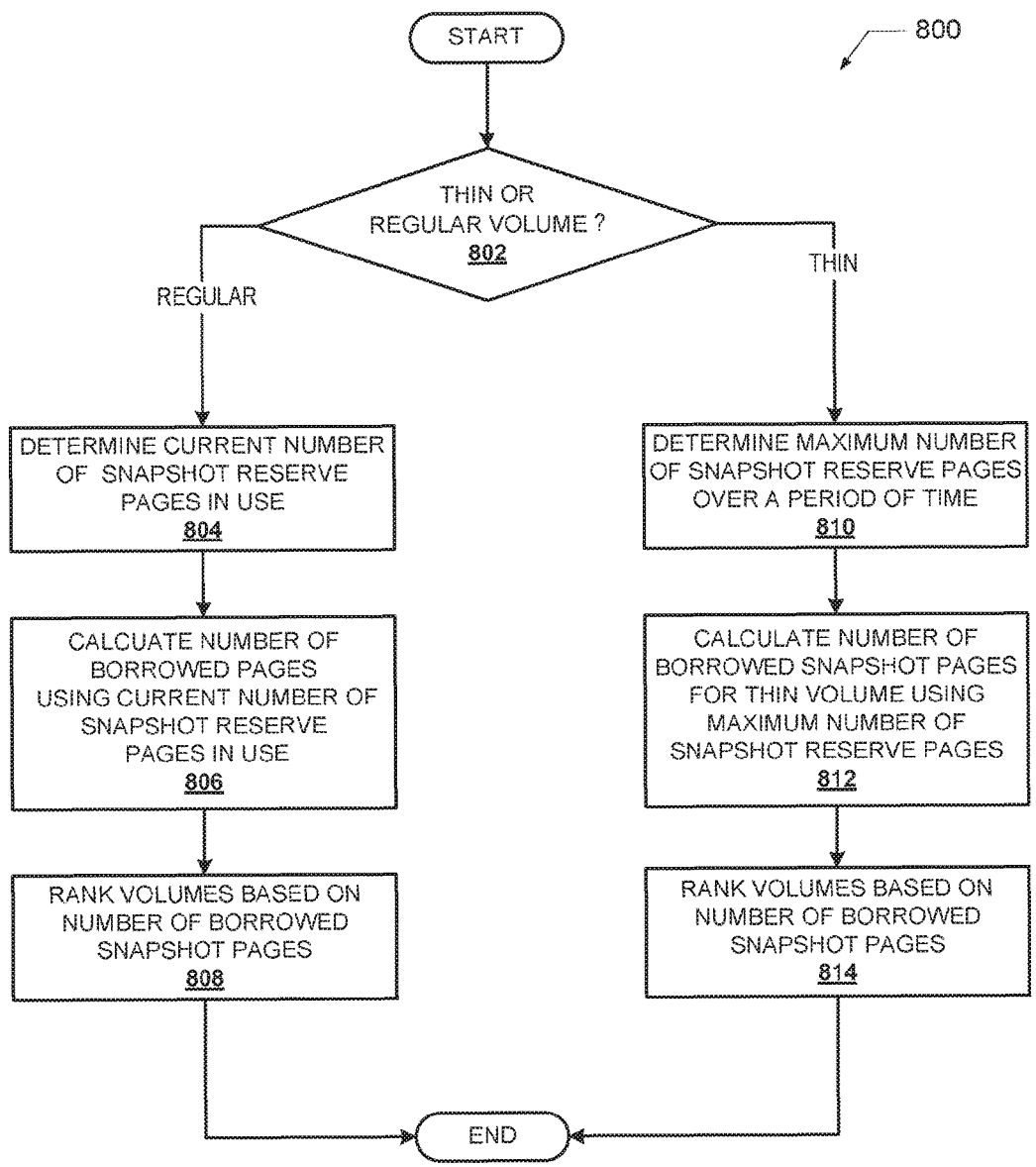
FIG. 8 is a flow chart illustrating one example of the method by which volumes are ranked for snapshot deletion, according to one or more embodiments.

With reference to FIG. 8, a flow chart illustrating one embodiment of a method for ranking volumes for snapshot deletion is shown. Method 800 begins at the start block and proceeds to decision block 802 where trimmer 218 determines if the volume is a thin volume (e.g., thin volume 1 302) or a regular volume (e.g., regular volume 2 322). In response to the volume being a regular volume, trimmer 218 determines a current number of snapshot reserve pages in use (block 804) and calculates the number of borrowed pages (block 806). The number of borrowed pages for a regular volume is calculated as the number of snapshot pages in use less the current number of snapshot reserve pages. At block 808, trimmer 218 ranks the volumes based on the number of borrowed pages. The volume with the largest number of borrowed pages is ranked first and the volume with the smallest number of borrowed pages is ranked last. Method 800 then terminates at the end block.

In response to the volume being a thin volume, trimmer 218 determines a maximum number of snapshot reserve pages over a period of time (block 810). The maximum number of snapshot reserve pages is the largest number of snapshot reserve pages that have ever been allocated for a respective volume in a time period. Trimmer 218 calculates the number of borrowed pages based on the maximum number of snapshot reserve pages (block 812). The number of borrowed pages for a thin volume is calculated as the number of snapshot pages in use less the maximum number of allocated snapshot reserve pages. Calculating the number of borrowed pages based on the maximum number of snapshot reserve pages preferentially ranks thin volumes lower compared to regular volumes to minimize the effect of a possible loss of space as a result of an UNMAP command being issued. At block 814, trimmer 218 ranks the volumes based on the number of borrowed pages. The volume with the largest number of borrowed pages is ranked first and the volume with the smallest number of borrowed pages is ranked last. Method 800 then ends.

Figure 9:
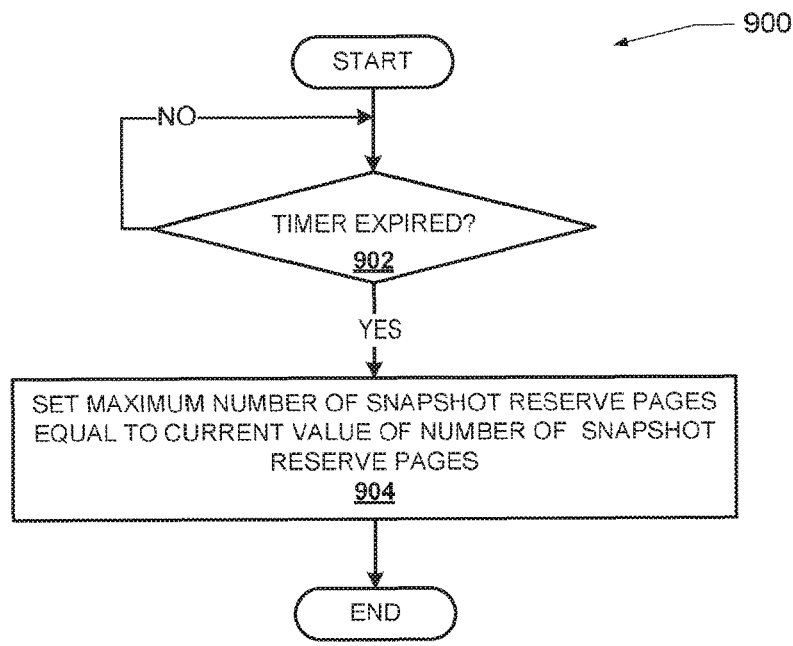
FIG. 9 is a flow chart illustrating one example of the method by which preferential ranking of thin volumes is removed, according to one or more embodiments.

FIG. 9 illustrates an example method by which the preferential ranking of thin volumes is removed. Method 900 begins at the start block and proceeds to block 902 where trimmer 218 determines if a timer has expired. The timer is used to expire the extra borrowed space given to thin volumes (i.e., thin volume 1 302) based on the maximum number of snapshot reserve pages. The timer can be set to a fixed time period. In one embodiment, the time period can be 5 days, for example. In another embodiment, the time period can be 10 days, for example. As older snapshots are deleted on a schedule, the thin volume should have sufficient space to store the desired number of snapshots without the additional space resulting from calculating the number of borrowed pages using the maximum number of snapshot reserve pages.

In response to the timer not being expired, trimmer 218 continues to check if the timer has expired (decision block 902). In response to the timer having expired, trimmer 218 sets the maximum number of snapshot reserve pages for the thin volume equal to the current value of the number of snapshot reserve pages (block 904). Method 900 terminates at the end block.

Figure 10:
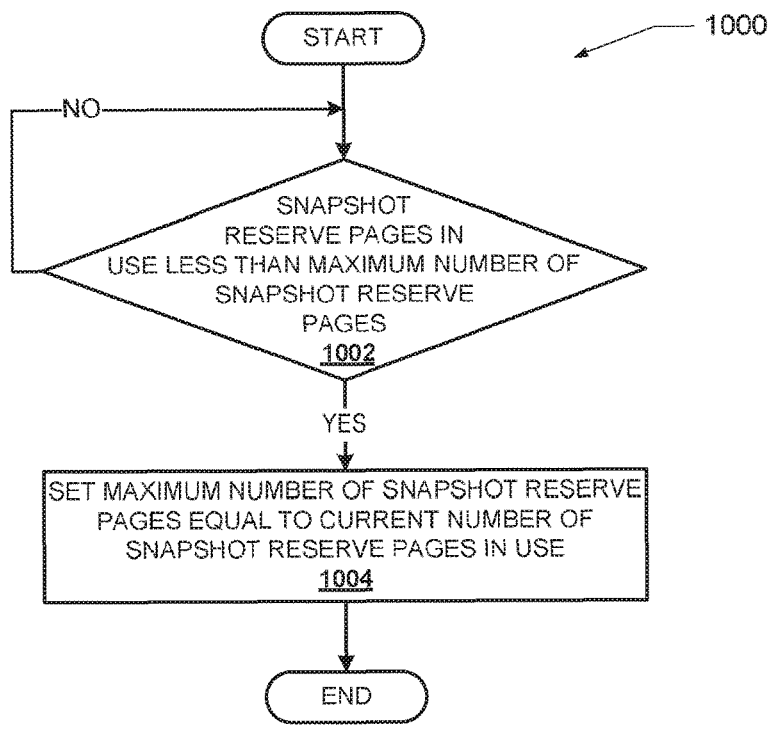
FIG. 10 is a flow chart illustrating another example of the method by which preferential ranking of thin volumes is removed, according to one or more embodiments.

FIG. 10 illustrates another example method by which the preferential ranking of thin volumes is removed. Method 1000 begins at the start block and proceeds to decision block 1002 where trimmer 218 determines if the number of snapshot reserve pages in use is less than the maximum number of snapshot reserve pages. In response to the number of snapshot reserve pages in use not being less than the maximum number of snapshot reserve pages, method 1000 returns to block 1002. In response to the number of snapshot reserve pages in use being less than the maximum number of snapshot reserve pages, trimmer 218 sets the maximum number of snapshot reserve pages for the thin volume equal to the current number of snapshot reserve pages in use (block 1004). Method 1000 then terminates at the end block.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method of managing snapshots on a storage system, the method comprising:
    a storage controller receiving a request to store a first snapshot associated with a first volume among a plurality of volumes on the storage system;
    determining if an assigned snapshot reserve space associated with the first volume remaining is less than an amount of space that is required to store the first snapshot;
    in response to the assigned snapshot reserve space remaining being less than the amount of space required:
    ranking the volumes based on a number of snapshots being maintained and an amount of borrowed space being utilized by each respective volume; and borrowing snapshot reserve space from at least one of an unused assigned space or an unused unassigned space within the storage system; and
    storing at least a portion of the first snapshot to the borrowed snapshot reserve space.

2. The method of claim 1, further comprising:
    selecting at least one of the unused assigned space or the unused space within the storage system based on the selected space being greater than the amount of space required.

3. The method of claim 1, further comprising:
    determining if a total storage system utilization is greater than a pre-determined total storage system utilization threshold; and
    in response to the total storage system utilization being greater than the pre-determined total storage system utilization threshold, ranking the volumes and deleting at least one of the snapshots based on the ranking of the plurality of volumes.

4. The method of claim 1, wherein ranking the volumes comprises:
    determining the number of snapshots being maintained for each volume; and
    determining the total amount of borrowed snapshot reserve space being utilized by each volume having borrowed snapshot reserve space.

5. The method of claim 1, further comprising:
    iteratively ranking the volumes and deleting a snapshot of at least one volume until all remaining volumes have only a single snapshot remaining;
    determining if only one snapshot remains for each of the volumes; and
    in response to only one snapshot remaining for each of the volumes, while the storage utilization remains above the pre-determined total storage system utilization threshold, performing additional ranking and deletion of snapshots based on a relative size of the snapshots for each of the volumes until the storage utilization is no longer above the pre-determined total storage system utilization threshold.

6. The method of claim 1, further comprising ranking the volumes by:
    identifying if the first volume is a thin volume;
    in response to the first volume being a thin volume, determining a maximum number of snapshot reserve pages allocated to the thin volume over a preceding period;
    calculating a number of borrowed snapshot pages, wherein the number of borrowed snapshot pages is equal to a number of snapshot reserve pages in use minus the maximum number of snapshot reserve pages;
    ranking the volumes based on the number of borrowed snapshot pages; and
    in response to an unmap command, releasing additional snapshot pages after a pre-set time.

7. The method of claim 1, further comprising:
    identifying if the first volume is a thin volume;
    in response to the first volume being a thin volume, determining if a size of the first volume is decreasing;
    in response to the size of the first volume decreasing, determining a number of snapshots associated with the first volume;
    determining if an assigned snapshot space size associated with the first volume is sufficient to store the number of snapshots; and
    in response to the assigned snapshot space size being insufficient to store the number of snapshots, borrowing snapshot space from at least one of an unused assigned space or from unused unassigned space within the storage system.

8. A storage system comprising:
    a plurality of storage devices;
    a storage controller coupled to the storage devices for controlling storage operations, wherein the storage controller comprises logic that:
    receives a request to store a first snapshot associated with a first volume among a plurality of volumes on the storage system;
    determines if an assigned snapshot reserve space remaining associated with the first volume is less than an amount of space that is required to store the first snapshot;
    in response to the assigned snapshot reserve space remaining being less than the amount of space required:
    ranks the volumes based on the number of snapshots being maintained and the amount of borrowed space being utilized by each respective volume; and borrows snapshot reserve space from at least one of an unused assigned space or an unused unassigned space within the storage system; and stores at least a portion of the first snapshot to the borrowed snapshot reserve space.

9. The storage system of claim 8, wherein the storage controller further comprises logic that selects at least one of the unused assigned space or the unused space within the storage system based on the selected space being greater than the amount of space required.

10. The storage system of claim 8, wherein the storage controller further comprises logic that:
determines if a total storage system utilization is greater than a pre-determined total storage system utilization threshold; and
in response to the total storage system utilization being greater than the pre-determined total storage system utilization threshold, deletes at least one of the snapshots based on the ranking of the volumes.

11. The storage system of claim 8, wherein to rank the volumes, the storage controller further comprises logic that:
determines the number of snapshots being maintained for each volume; and
determines the total amount of borrowed snapshot reserve space being utilized by each volume having borrowed snapshot reserve space.

12. The storage system of claim 8, wherein the storage controller further comprises logic that:
iteratively ranks the volumes and deletes a snapshot of at least one volume until all remaining volumes have only a single snapshot remaining;
determines if only one snapshot remains for each of the volumes; and
in response to only one snapshot remaining for each of the volumes, while the storage utilization remains above the pre-determined total storage system utilization threshold, performs additional ranking and deletion of snapshots based on a relative size of the snapshots for each of the volumes until the storage utilization is no longer above the pre-determined total storage system utilization threshold.

13. The storage system of claim 8, wherein the storage controller further comprises logic that:
identifies if the first volume is a thin volume;
in response to the first volume being a thin volume, determines a maximum number of snapshot reserve pages allocated to the thin volume over a preceding period;
calculates a number of borrowed snapshot pages, wherein the number of borrowed snapshot pages is equal to a number of snapshot reserve pages in use minus the maximum number of snapshot reserve pages; and
ranks the volumes based on the number of borrowed snapshot pages.

14. The storage system of claim 8, wherein the storage controller further comprises logic that:
identifies if the first volume is a thin volume;
in response to the first volume being a thin volume, determines if a size of the first volume is decreasing;
in response to the size of the first volume decreasing, determines a number of snapshots associated with the first volume;
determines if a first snapshot space size associated with the first volume is sufficient to store the number of snapshots; and in response to the first snapshot space size being insufficient to store the number of snapshots, borrows snapshot space from at least one of an unused assigned space or from unused unassigned space within the storage system.

15. An information handling system comprising:
one or more processors;
a storage system coupled to the processor and in communication with the processor, the storage system comprising: a plurality of storage devices and a storage controller coupled to the storage devices, the storage controller having firmware executing thereon to provide control of storage system operations wherein the firmware configures the storage controller to:
receive a request to store a first snapshot associated with a first volume among a plurality of volumes on the storage system;
determine if an assigned snapshot reserve space remaining associated with the first volume is less than an amount of space that is required to store the first snapshot;
in response to the assigned snapshot reserve space remaining being less than the amount of space required:
rank the volumes based on the number of snapshots being maintained and the amount of borrowed space being utilized by each respective volume; and borrow snapshot reserve space from at least one of an unused assigned space or an unused unassigned space within the storage system; and
store at least a portion of the first snapshot to the borrowed snapshot reserve space.

16. The information handling system of claim 15, wherein the firmware further configures the storage controller to:
identify if the first volume is a thin volume;
in response to the first volume being a thin volume, determine a maximum number of snapshot reserve pages allocated to the thin volume over a preceding period;
calculate a number of borrowed snapshot pages, wherein the number of borrowed snapshot pages is equal to a number of snapshot reserve pages in use minus the maximum number of snapshot reserve pages; and
rank the volumes based on the number of borrowed snapshot pages.

17. The information handling system of claim 15, wherein the firmware further configures the storage controller to:
determine if a total storage system utilization is greater than a pre-determined total storage system utilization threshold; and
in response to the total storage system utilization being greater than the pre-determined total storage system utilization threshold, delete at least one of the snapshots based on the ranking of the volumes.

18. The information handling system of claim 15, wherein the firmware further configures the storage controller to:
determine the number of snapshots being maintained for each volume; and
determine the total amount of borrowed snapshot reserve space being utilized by each volume having borrowed snapshot reserve space.

19. The information handling system of claim 15, wherein the firmware further configures the storage controller to:
iteratively rank the volumes and delete a snapshot of at least one volume until all remaining volumes have only a single snapshot remaining;
determine if only one snapshot remains for each of the volumes; and in response to only one snapshot remaining for each of the volumes, while the storage utilization remains above the pre-determined total storage system utilization threshold, perform additional ranking and deletion of snapshots based on a relative size of the snapshots for each of the volumes until the storage utilization is no longer above the pre-determined total storage system utilization threshold.

20. The information handling system of claim 15, wherein the firmware further configures the storage controller to:
identify if the first volume is a thin volume;
in response to the first volume being a thin volume, determine if a size of the first volume is decreasing;
in response to the size of the first volume decreasing, determine a number of snapshots associated with the first volume;
determine if a first snapshot space size associated with the first volume is sufficient to store the number of snapshots; and
in response to the first snapshot space size being insufficient to store the number of snapshots, borrow snapshot space from at least one of a unused, assigned space and unused unassigned space within the storage system.

* * * * *